(12) United States Patent
Smith

(10) Patent No.: US 7,403,687 B2
(45) Date of Patent: Jul. 22, 2008

(54) REINFORCED TIGHT-BUFFERED OPTICAL FIBER AND CABLES MADE WITH SAME

(75) Inventor: John C. Smith, Columbia, SC (US)

(73) Assignee: Pirelli Communications Cables and Systems USA, LLC, Lexington, SC (US)

( * ) Notice: Subject to any disclaimer, the term of this patent is extended or adjusted under 35 U.S.C. 154(b) by 762 days.

(21) Appl. No.: 10/023,713

(22) Filed: Dec. 21, 2001

(65) Prior Publication Data

US 2003/0118296 A1    Jun. 26, 2003

(51) Int. Cl.
    *G02B 6/44*    (2006.01)
(52) U.S. Cl. ..................................... 385/102
(58) Field of Classification Search ......... 385/100–113
    See application file for complete search history.

(56) References Cited

U.S. PATENT DOCUMENTS

| | | | |
|---|---|---|---|
| 4,009,932 A | 3/1977 | Ferrentino |
| 4,844,604 A | 7/1989 | Bishop et al. |
| 4,893,893 A | 1/1990 | Claxton et al. |
| 4,929,047 A | 5/1990 | Dubots et al. |
| 5,011,260 A | 4/1991 | Marx et al. |
| 5,181,268 A | 1/1993 | Chien |
| 5,636,307 A | 6/1997 | Cowen et al. |
| 5,684,910 A | 11/1997 | Chapin et al. |
| 5,881,194 A | 3/1999 | Duecker |
| 5,908,873 A | 6/1999 | Shustack |
| 5,977,202 A | 11/1999 | Chawla et al. |
| 5,982,967 A | 11/1999 | Mathis et al. |
| 6,208,790 B1 | 3/2001 | Zopf et al. |

FOREIGN PATENT DOCUMENTS

| | | |
|---|---|---|
| DE | 29 02 576 | 7/1980 |
| DE | 296 20 220 | 1/1997 |
| EP | 0 106 548 | 4/1984 |
| EP | 0 856 761 | 8/1998 |
| FR | 2 509 872 | 1/1983 |
| JP | 60 033520 | 2/1985 |

OTHER PUBLICATIONS

Patent Abstracts of Japan, vol. 009, No. 157 (p. 369).
Standard Search Report from European Patent Office dated Sep. 12, 2002.

*Primary Examiner*—Khiem Nguyen
(74) *Attorney, Agent, or Firm*—Finnegan, Henderson, Farabow, Garrett & Dunner, L.L.P.

(57) ABSTRACT

A tight-buffered optical fiber includes an optical fiber, at least a first buffer layer of a polymer material enclosing the optical fiber, and a plurality of strength members embedded in the first buffer layer and longitudinally disposed around the optical fiber. A second buffer layer of polymer material may also be formed to enclose the first buffer layer. The first and second buffer layer may be made of acrylate and may be either radiation or thermally curable. The second buffer layer may also have a plurality of strength members embedded in it and longitudinally disposed around the optical fiber.

22 Claims, 4 Drawing Sheets

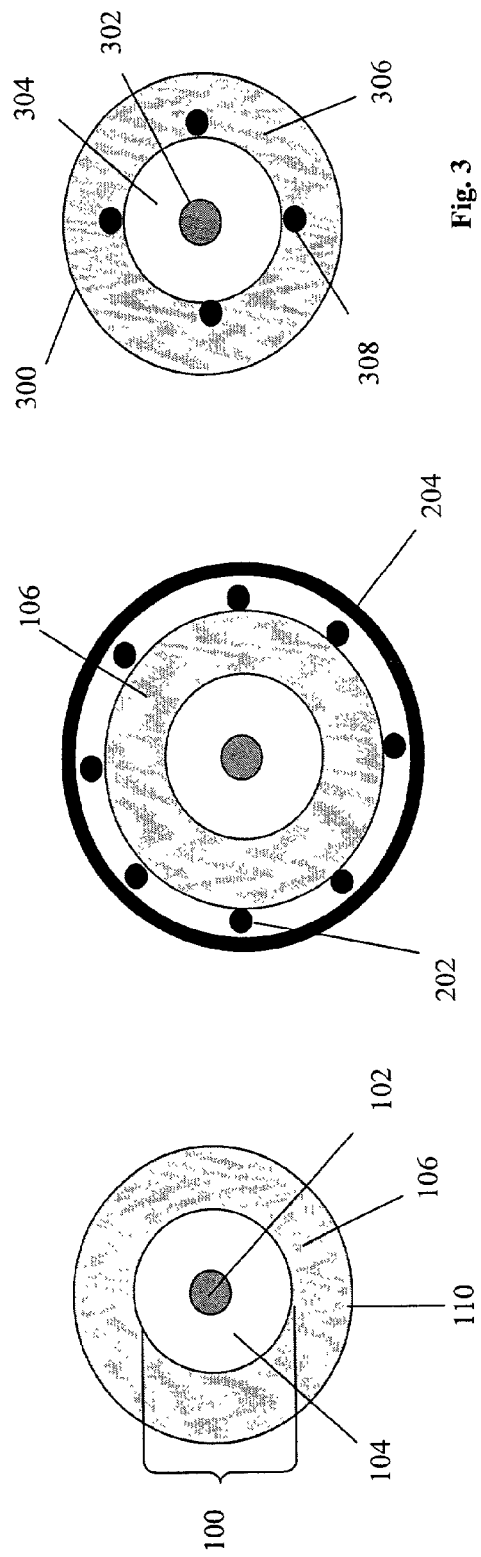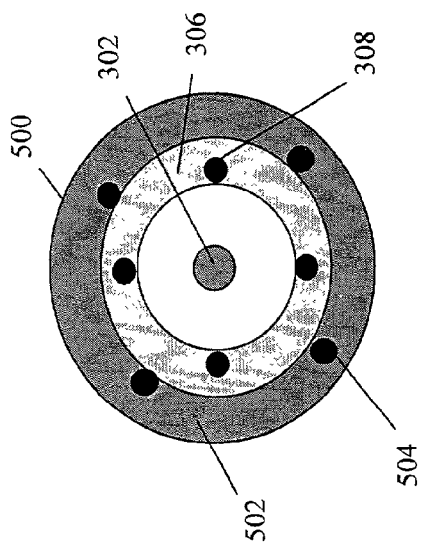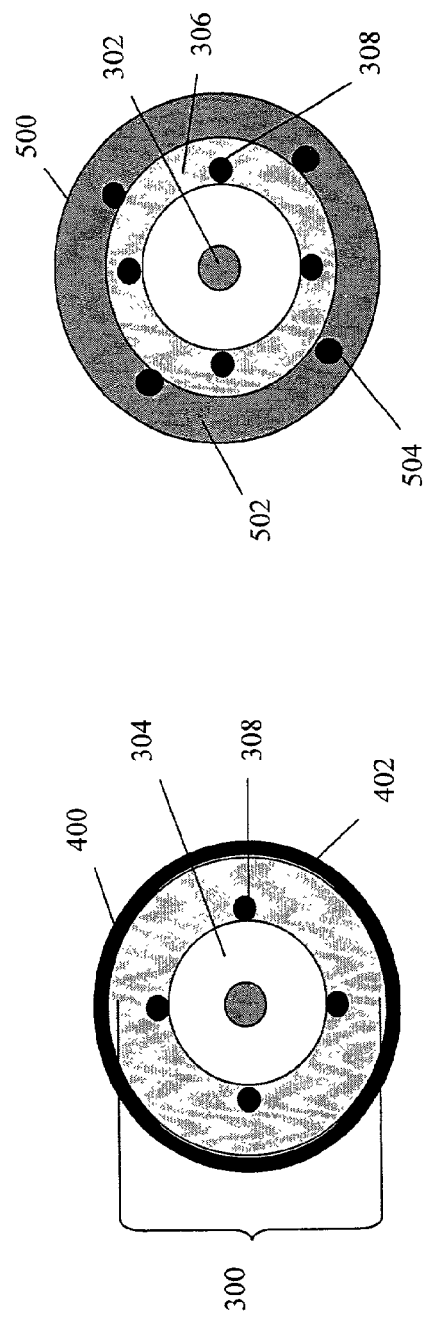

REINFORCED TIGHT-BUFFERED OPTICAL FIBER AND CABLES MADE WITH SAME

BACKGROUND OF THE INVENTION

The present invention relates generally to tight-buffered optical fibers and optical cables that contain tight-buffered fibers. More particularly, the present invention relates to tight-buffered optical fibers that include strength members embedded in a buffer layer and cables containing them.

Optical fibers are now in widespread use as a communication media. Typically, as illustrated in cross section in FIG. 1, a conventional optical fiber 100 comprises light-transmissive portion 102 enclosed by at least one layer of polymer coating 104. Polymer coating 104 is usually made of an acrylate material. Light-transmissive portion 102 in optical fiber 100 may be either glass or a polymer. If the optical fiber is glass, optical fiber 100 most often has an overall diameter of about 0.25 mm. If it is polymer, optical fiber 100 most often has an overall diameter of about 0.5 mm.

Optical fibers are often surrounded by one or more protective sheaths to form a buffer. In FIG. 1, for example, optical fiber 100 is surrounded by a buffer layer 106 to form tight-buffered optical fiber 110. The buffer provides mechanical and environmental protection for the optical fiber and may provide necessary spacing between numerous fibers grouped together so that industry-standard connectors can be used. Unlike standard optical fibers, tight-buffered optical fibers generally have an outer diameter of 0.9 mm. The buffer layers are most often made of thermoplastic polymers such as PVC, Nylon, or the like.

The protective sheath in a tight-buffered optical fiber may include several layers. For instance, release layers within the buffer layers may help to improve the strippability of the buffer layers that surround the optical fiber. Some layers or materials selected for the buffer layers often have specialized properties, such as flame retardancy.

Various patents describe conventional tight-buffered optical fibers. For example, U.S. Pat. No. 5,181,268, which is hereby incorporated by reference, discloses a strippable tight-buffered optical fiber that includes an optical fiber, a first protective coating in contact with the cladding, an interfacial layer for easy strippability in contact with the first coating, and a buffer layer in contact with the interfacial layer.

U.S. Pat. No. 5,977,202 and U.S. Pat. No. 6,208,790, both of which are incorporated herein by reference, disclose alternative materials for the tight-buffer layers. The '202 patent teaches a radiation-curable composition for use as an optical fiber material or coating. The '790 patent teaches an ultraviolet light-curable polymer matrix, which is applied to the optical fibers and is substantially instantaneously cured in-place at ambient temperatures.

Cables using tight-buffered optical fibers are often reinforced with strengthening yarns, such as aramid or fiberglass yarns. The strengthening yarns are disposed longitudinally around the tight-buffer layers, and an overall jacket encloses the tight-buffer layers and the strengthening yarns. For instance, FIG. 2 illustrates a cross-section of a simplex cable that contains a tight-buffered optical fiber. The tight-buffered optical fiber is reinforced by surrounding buffer layer 106 with a plurality of strength members 202 and enclosing the plurality of strength members 202 with an overall jacket 204. The strengthening yarns adds to the overall cable diameter.

U.S. Pat. No. 5,982,967 and U.S. Pat. No. 5,011,260, which are incorporated herein by reference, disclose tight-buffered optical fibers that include strengthening yarns. The '967 patent discloses a glass optical fiber surrounded by a nylon buffer layer. The buffer layer is surrounded by a plurality of aramid fiber strength members that are enclosed in an overall jacket. The '260 patent discloses a tight-buffered optical fiber comprising a glass core and cladding enclosed by at least one layer of coating material. The at least one coating material layer is in turn enclosed by a plastic buffer layer. The '260 patent also discloses a release layer intermediate the plastic buffer layer and the at least one layer of coating material. When incorporated into a cable, the tight-buffered optical fibers of the '260 patent are enclosed in an overall jacket with strengthening yarns disposed between the tight-buffered optical fiber and the jacket.

U.S. Pat. No. 4,893,893, which is incorporated herein by reference, discloses tight-buffered optical fibers that include a plurality of fibrous strands interposed between the optical fiber and an outer plastic buffer layer. The fibrous strands act as strength members for the buffered optical fiber. According to the '893 patent, the buffer layer is tubed over the strands with a controlled drawdown instead of being applied by pressure extrusion. Consequently, the buffer layer is disposed concentrically about the strength members and has a predetermined compressive engagement therewith, which allows for controlled strippability of the buffer layer from the fiber.

The '893 patent also discloses a duplex optical fiber cable, which includes two tight-buffered optical fibers of the above construction. The two tight-buffered optical fibers are enclosed in a common outer jacket with a rip cord positioned between the two tight-buffered optical fibers. The rip cord is used to tear a slit in the jacket, which allows for the removal of the jacket from the two buffered optical fibers.

Applicants have observed that existing cables using tight-buffered optical fibers do not use strength members effectively or efficiently. For instance, these types of tight-buffered fibers have strength members that are separated from the optical fiber by at least a layer of polymer coating. Moreover, by containing strength members between buffer layers, conventional tight-buffered optical fibers sacrifice thickness in the remaining protective layers. Consequently, the conventional tight-buffered optical fiber does not receive the maximum amount of protection from the environment.

SUMMARY OF THE INVENTION

Applicants have found that a tight-buffered optical fiber with strengthening yarns embedded in at least one tight-buffer layer provides several advantages in manufacturing and using optical fibers. In particular, Applicants have found that embedding strengthening yarns in a tight-buffer layer produces a tight-buffered optical fiber that can provide desirable strength characteristics with the use of relatively few strengthening yarns. As a result, the overall diameter of a multi-fiber cable consistent with the present invention may have a small overall diameter with an efficient use of strengthening yarns.

In one aspect, a tight-buffered optical fiber consistent with the principles of the invention comprises an optical fiber, at least a first buffer layer of a polymer material enclosing the optical fiber, and a plurality of strength members embedded in the first buffer layer and longitudinally disposed around the optical fiber. The first buffer layer may be made of an acrylate based resin and may be either radiation or thermally curable.

A second buffer layer of polymer material is formed to enclose the first buffer layer. The second buffer layer may also be made of an acrylate based resin and may be either radiation or thermally curable. In addition, the second buffer layer may also have a plurality of strength members embedded in it and longitudinally disposed around the optical fiber. The strength members may be yarns selected from the group of materials comprising aramid, fiberglass, and liquid crystal polymer yarns.

In another aspect, an optical fiber cable consistent with the present invention comprises at least one tight-buffered optical fiber that includes an optical fiber, at least a first buffer layer of a polymer material enclosing the optical fiber, and a plurality of strength members embedded in the first buffer layer and longitudinally disposed around the optical fiber. The tight-buffered optical fiber of this aspect may also be enclosed in an overall jacket, which includes a water propagation blocking means. The water propagation blocking means may be located between the overall jacket and the at least one tight-buffered optical fiber.

In yet another aspect of the present invention, a tight-buffered optical fiber comprises an optical fiber, one or more buffer layers of a polymer material enclosing the optical fiber, and a plurality of strength members embedded in one or more of the buffer layers and longitudinally disposed around the optical fiber. In addition, an overall protective jacket may also be used to enclose the optical fiber, buffer layer(s), and strength members that comprise the tight-buffered optical fiber.

In yet a further aspect, a method of making a tight-buffered optical fiber consistent with the present invention comprises the steps of passing an optical fiber through an applicator, placing a plurality of strengthening yarns longitudinally around the optical fiber in the applicator, and applying a first buffer layer of a cured polymeric material over the optical fiber. The method may also include the steps of locating a second plurality of strengthening yarns longitudinally around the cured first buffer layer and applying a second buffer layer of a cured polymeric material over the first buffer layer. Preferably, the first and second plurality of strengthening yarns are placed simultaneously with the respective first and second buffer layers, so that said first and second plurality of strengthening yarns are embedded in the respective first and second buffer layer. These buffer layers may be cured using ultraviolet or thermal radiation, and may also be covered with an extruded protective layer.

It is to be understood that both the foregoing general description and the following detailed description are exemplary and exemplary only and are intended to provide further explanation of the invention as claimed. The following description, as well as the practice of the invention, sets forth and suggests additional advantages and purposes of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1 illustrates a cross section of a conventional tight-buffered optical fiber.

FIG. 2 illustrates a simplex cable employing a conventional tight-buffered fiber.

FIG. 3 illustrates a cross section of a tight-buffered optical fiber consistent with one embodiment of the present invention.

FIG. 4 illustrates a cross section of an optical fiber simplex cable employing a tight-buffered optical fiber consistent with one embodiment of the present invention.

FIG. 5 illustrates a cross section of a tight-buffered optical fiber consistent with one embodiment of the invention.

DETAILED DESCRIPTION OF THE PREFERRED EMBODIMENTS

Figure 6:
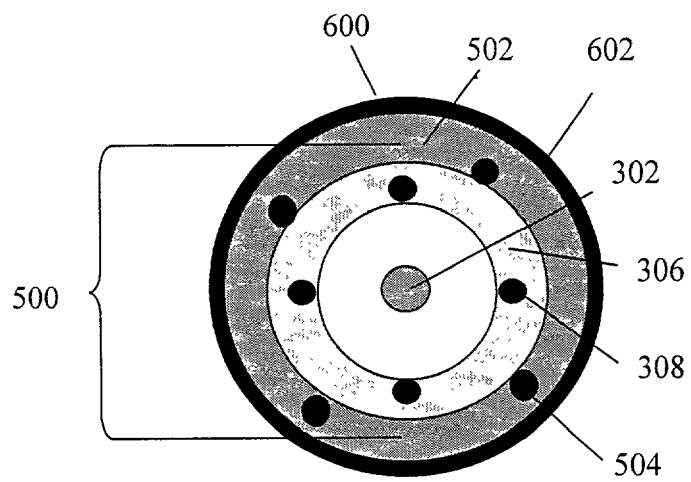
FIG. 6 illustrates a cross section of a modification of the tight-buffered optical fiber shown in FIG. 5.

Reference will now be made to various embodiments consistent with the present invention, examples of which are shown in the accompanying drawings and will be obvious from the description of the various embodiments of the present invention. In the drawings, whenever possible, the same reference numbers represent the same or similar elements in the different drawings.

For the purposes of this description, the term "optical fiber" is intended within its common meaning in the art. Thus, an optical fiber generally comprises a central light-transmissive portion and a protective polymer coating. The light-transmissive portion, which is typically glass, in turn comprises a core portion and a cladding portion. The diameter of the optical fiber is generally about 250 microns. The protective polymer coating may be made from an acrylate-based polymer and may comprise one or more layers. For example, the protective coating may have an inner layer and an outer layer, the inner layer being softer than the outer layer.

In addition to glass optical fibers, the common meaning within the art of the term "optical fiber" also includes plastic optical fibers. Plastic optical fibers generally comprise a central polymer for light propagation and a protective polymer coating. The central polymer in turn comprises a core portion and a cladding portion, both of which may comprise a transparent perfluorinated polymer. The protective coating is preferably a transparent polymer and may have one or more layers. Typically, the diameter of plastic optical fibers is about 500 microns. Thus, the term "optical fiber" in the description of the following embodiments of the present invention may refer either to glass-core or polymer-core waveguides.

In accordance with the general principles of the present invention, a tight-buffered optical fiber includes an optical fiber, at least a first buffer layer of a polymer material enclosing the optical fiber, and a plurality of strength members embedded in the first buffer layer and longitudinally positioned with respect to the optical fiber.

As embodied herein and generally referred to as 300 in FIG. 3, a tight-buffered optical fiber consistent with the present invention includes an optical fiber 302 enclosed by a protective coating 304. Optical fiber 302 and protective coating 304 may be further enclosed by a buffer layer 306. A plurality of strength members 308 are embedded in buffer layer 306 and longitudinally positioned with respect to optical fiber 302.

Buffer layer 306 may be a polymer material. The polymer material of buffer layer 306 may be of a type of material that is converted from a liquid curable composition into a cured polymeric material, in particular a resin, during the manufacturing of the fiber. The conversion of the liquid curable composition is not necessarily total, as minor amounts of its components may be lost (e.g. through evaporation) during the curing process or may remain as non-reacted components inside the cured polymer. For instance, the cure degree of an acrylate based resin is typically of at least 90%, preferably of at least 95%, said percentage indicating the amount of the unreacted acrylate unsaturations in the final cross-linked resin with respect to the initial photo-curable composition (determined for instance by means of MICRO-FTIR technique).

Buffer layer 306 also should be easily removable from protective fiber coating 304, and may have flame retardant properties and/or a low coefficient of friction. A polymer obtained by curing a liquid curable composition, which incorporates one or more of the above qualities, may be used for buffer layer 306 and can be selected from the group of materials including acrylates, RTV materials such as liquid curable silicones, Silicone Polymer Dimethyl Polysiloxane, and liquid plastisols such as vinyl plastisols. Other families of polymers may also be suitable materials for buffer layer 306, as long as they are capable of being converted from a liquid curable composition into a solid polymeric material, as described above. The selected polymer material for buffer layer 306 may be either radiation or thermally curable.

The polymeric material forming the buffer layer 306 is preferably obtained by curing a radiation-curable liquid composition comprising at least one oligomer, and preferably at least one monomer, both having at least one functional group capable of polymerization when exposed to actinic radiation. The liquid curable composition typically further comprises at least one photoinitiator. Suitable radiation-curable oligomers, monomers and photoinitiators are now well known and within the knowledge of the skill of the art. Commonly, the radiation-curable functionality is an ethylenic unsaturation, preferably an acrylate or meta-acrylate function, which can be polymerized preferably through radical polymerization. The polymer material of the buffer layer is preferably an acrylate based resin, obtained by curing a radiation-curable liquid composition comprising at least one oligomer and preferably at least one monomer comprising an acrylate or methacrylate functionality. Suitable buffer layer materials may be those commonly employed in the art as "common coatings" or "matrix materials" for the manufacturing of optical fiber ribbons. Examples of suitable radiation-curable materials are disclosed, for instance in U.S. Pat. No. 4,844,604, U.S. Pat. No. 5,881,194, and U.S. Pat. No. 5,908,873 which are hereby incorporated by reference. Cablelite 3287C9-53 and Cablelite 9D7-463, which are available from DSM Desotech, Inc., are such suitable materials.

In this embodiment of FIG. 3, strength members 308 are embedded in buffer layer 306 and longitudinally positioned with respect to optical fiber 302. Strength members 308 may be, for example, aramid yarns such as Kevlar, Twaron, and Technora; or liquid crystal polymer yarns such as Vectran and Zylon; or fiberglass yarns. The yarns comprising strength member 308 are preferably less than or equal to about 500 denier. As readily known to one of ordinary skill in the art, a denier is a textile unit that expresses the weight of the yarn in grams/9000 meters.

For purposes of this description, longitudinal positioning of the strength members refers generally to the preferred placement of the members relative to the optical fiber. This positioning may be substantially in parallel between the members and the optical fiber, or the members may be stranded or wound around the optical fiber at a desired pitch, depending on the application. The strength members need not encircle the optical fiber. They may, for instance, be placed on only one side of the optical fiber, be diametrically opposed, or surround the circumference of the optical fiber.

For purposes of this description, it is to be understood that the term "embedded" when referring to the strength members in the buffer layer(s) is intended to include both a total encapsulation of strength members within the buffer layer material and a situation where the strength members are adjacent to and in contact with the optical fiber but are otherwise partially enclosed but not completely encapsulated in the buffer layer. In addition, or in another embodiment, the term "embedded" may be intended to include the strength members adjacent to and in contact with a first buffer layer, but otherwise partially enclosed but not completely enveloped by a second buffer layer.

In a further embodiment, FIG. 4 illustrates tight-buffered optical fiber 300 of FIG. 3 incorporated into a simplex (single optical fiber) cable. In this embodiment, a polymer jacket 402 encloses tight-buffered optical fiber 300. Polymer jacket 402 may be selected from a group of materials including polyolefins, nylon, PVC, low smoke halogen free materials, fluorocarbon polymers, acrylates, and the like. Additionally, water blocking materials, such as waxes, gels, grease-like materials, water swellable yarns, water swellable tapes, water swellable powders, or combinations thereof, may be located between tight-buffered optical fiber 300 and outer jacket 402.

In this embodiment, since strength members 308 are embedded in buffer layer 306, the need for a layer of strength yarns between tight-buffered optical fiber 300 and polymer jacket 402 is eliminated or reduced. Further, because the strength members are in closer proximity to and more tightly coupled with optical fiber 302, fewer strength members are needed to impart the required strength for a given application. These two considerations make it possible to either reduce the overall cable diameter compared with conventional designs, or if desired, increase the protective jacket thickness without increasing the overall cable diameter. Additionally, for a simplex cable, the need for an outer polymer jacket may be lessened depending on the material selected for buffer layer 306.

In another embodiment, FIG. 5 illustrates a tight-buffered optical fiber 500, which is produced from a modification of tight-buffered optical fiber 300 of FIG. 3. Tight-buffered optical fiber 300 is modified to include a second buffer layer 502 and a second plurality of strength members 504 embedded in second buffer layer 502. Strength members 504 are made of, for example, aramid, fiberglass, or liquid crystal polymers and are embedded and longitudinally disposed within second buffer layer 502 or are partially enclosed in second buffer layer 502 and in contact with first buffer layer 306. In a variation of the embodiment depicted in FIG. 5, reinforcing strength members (308 or 504) may be embedded in only one of the two buffer layers (306 and 502). Furthermore, second buffer layer 502 may have a low coefficient of friction and first buffer layer 306 may be made of a material having low tear resistance to enhance strippability of tight-buffered optical fiber 500.

In another alternative embodiment, FIG. 6 illustrates tight-buffered optical fiber 600, which is produced from a modification of tight-buffered optical fiber 500 of FIG. 5. Tight-buffered optical fiber includes either one or two buffer layers (306 and/or 502) having embedded strength yarns (308 and/or 504) and an additional polymer material layer(s) 602 surrounding the outermost buffer layer. Additional polymer material layer(s) 602 is sized so that tight-buffered optical fiber 600 has a predetermined overall diameter and may be selected from the group of materials comprising acrylates and RTV materials such as liquid silicones and plastisols. Preferably, the material selected is either radiation curable or thermally curable. Additional polymer material layer(s) 602 may also contain flame retardant additives, or be a flame resistant material, especially if the additional layer also serves as an outer jacket.

Preferably, the overall diameter of the reinforced tight-buffered optical fiber of the embodiments in FIGS. 3-6 is between 0.5 mm and 1.0 mm, and more preferably either 0.6 mm or 0.9 mm irrespective of the number of buffer layers. These preferred diameters are not restrictive of the present invention but rather are guided only by current market trends and currently available connector sizes. It should be also noted that reinforced tight-buffered optical fibers of the present invention, which employ polymer core/cladding type optical fibers, will generally have greater overall diameters.

Figure 7:
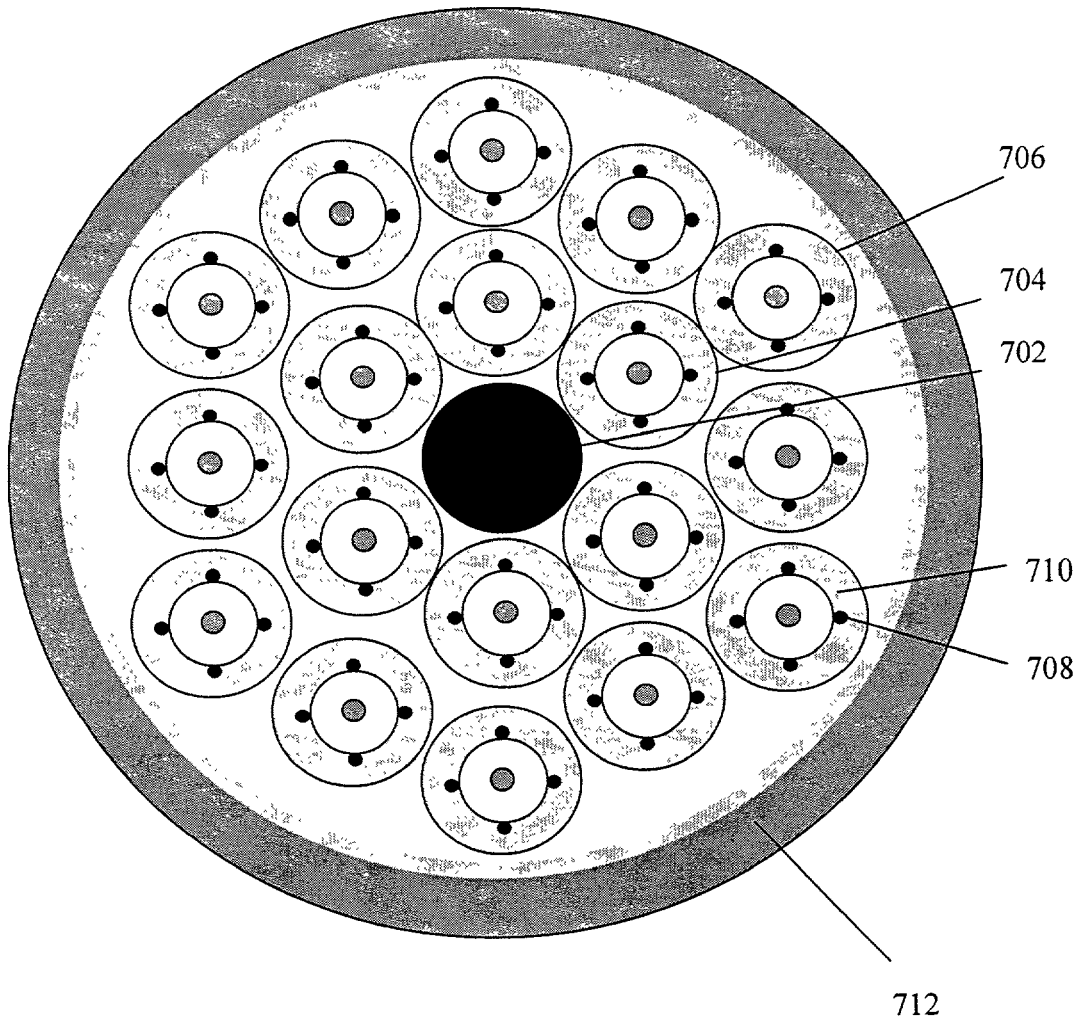
FIG. 7 illustrates a cross section of an optical fiber breakout cable employing a tight-buffered optical fiber consistent with one embodiment of the present invention.

In yet another embodiment of the present invention, FIG. 7 illustrates an optical fiber breakout cable 700. Unlike cables 400 and 600, cable 700 has a central strength member 702 and multiple tight-buffered optical fibers surrounding member 702. In particular, first and second tight-buffered optical fibers (such as 704 and 706) are stranded around central strength 702. Using tight-buffered optical fibers in accordance with the embodiments of the present invention, breakout cables, such as cable 700, that employ many tight-buffered optical fibers can be made smaller in diameter due to the reduction or elimination of additional strength yarns in the tight-buffered optical fibers. This reduction in diameter is accomplished by locating the strength yarns 708 used in tight-buffered optical fibers (such as 704 and 706) in the tight-buffer layer 710, as opposed to locating them outside of tight-buffer layer 710. If the strength yarns 708 were located around and outside of tight-buffer layer 710, an outer jacket surrounding each fiber would be needed to hold strength yarns 708 in place, and thus the overall diameter of breakout cable 700 would be increased.

For example, a conventional breakout cable with 18 optical fibers having reinforced fibers outside the buffer layer would typically have a diameter of 11.0 mm. In contrast, the same breakout cable, such as cable 700 with reinforced fibers embedded in a buffer layer, would have an overall diameter of 7.4 mm. Thus, breakout cable 700 made in accordance with the present invention is more efficient to manufacture and has a smaller diameter compared to other available breakout cables. The smaller diameter of the breakout cable of the present invention, for a given jacket wall thickness, reduces the circumference of the jacket and results in the use of less overall jacket material 712.

Figure 8:
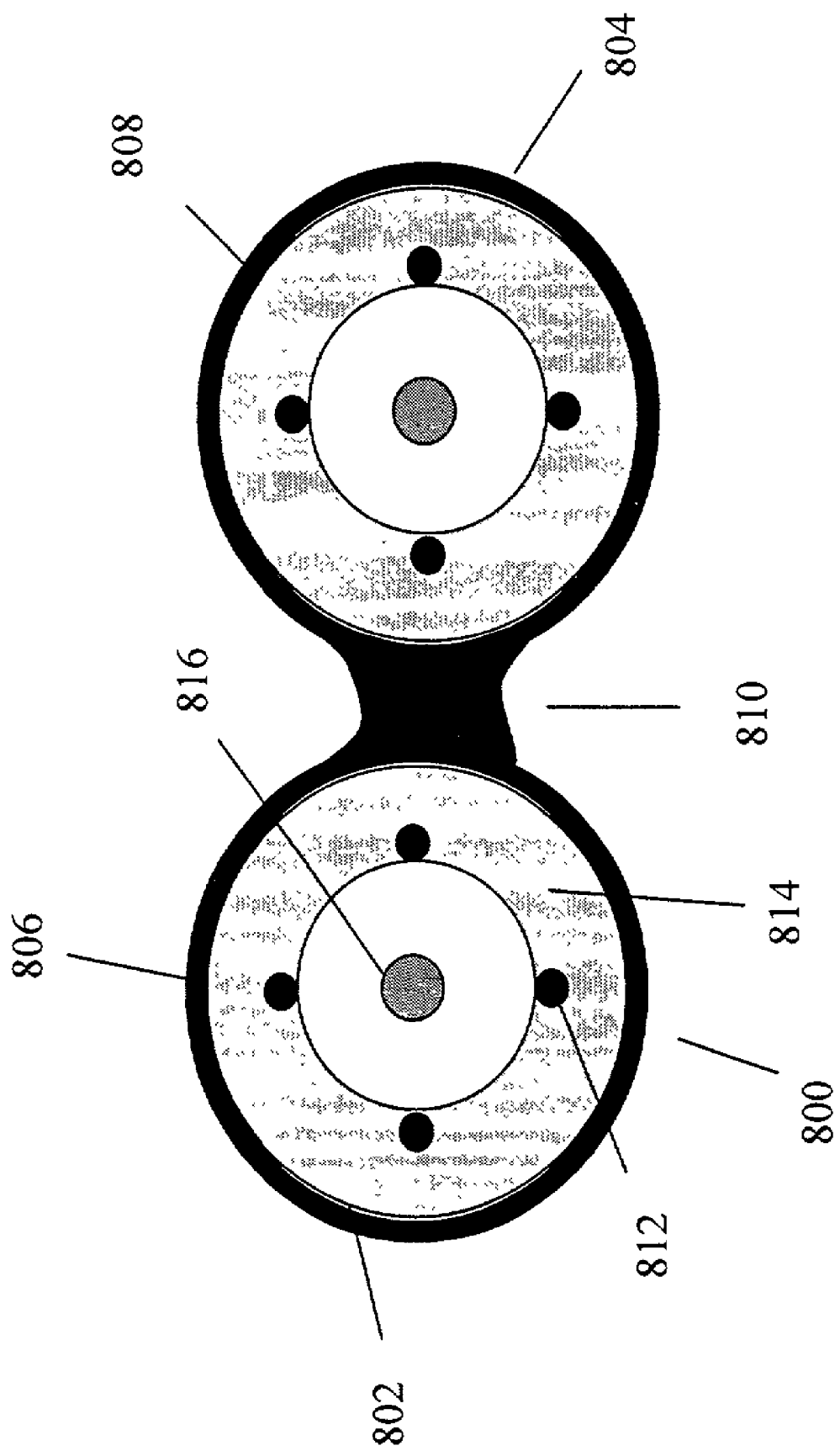
FIG. 8 illustrates a cross section of a zipcord optical fiber cable employing tight-buffered optical fibers consistent with one embodiment of the present invention.

FIG. 8 illustrates another embodiment consistent with the present invention known as a "zipcord" cable 800. This cable advantageously employs the tight-buffered optical fibers of the present invention described above in a miniaturized zipcord. Zipcord cable 800 comprises two tight-buffered optical fibers (802 and 804) that are encapsulated in overall jackets (806 and 808), and are joined by a web 810 of the jacket material. In this embodiment, the strengthening yarns 812, which are embedded in tight-buffer layer 814, may be used as ripcords to enhance the strippability of tight-buffer layer 814 from optical fiber 816.

Figure 9:
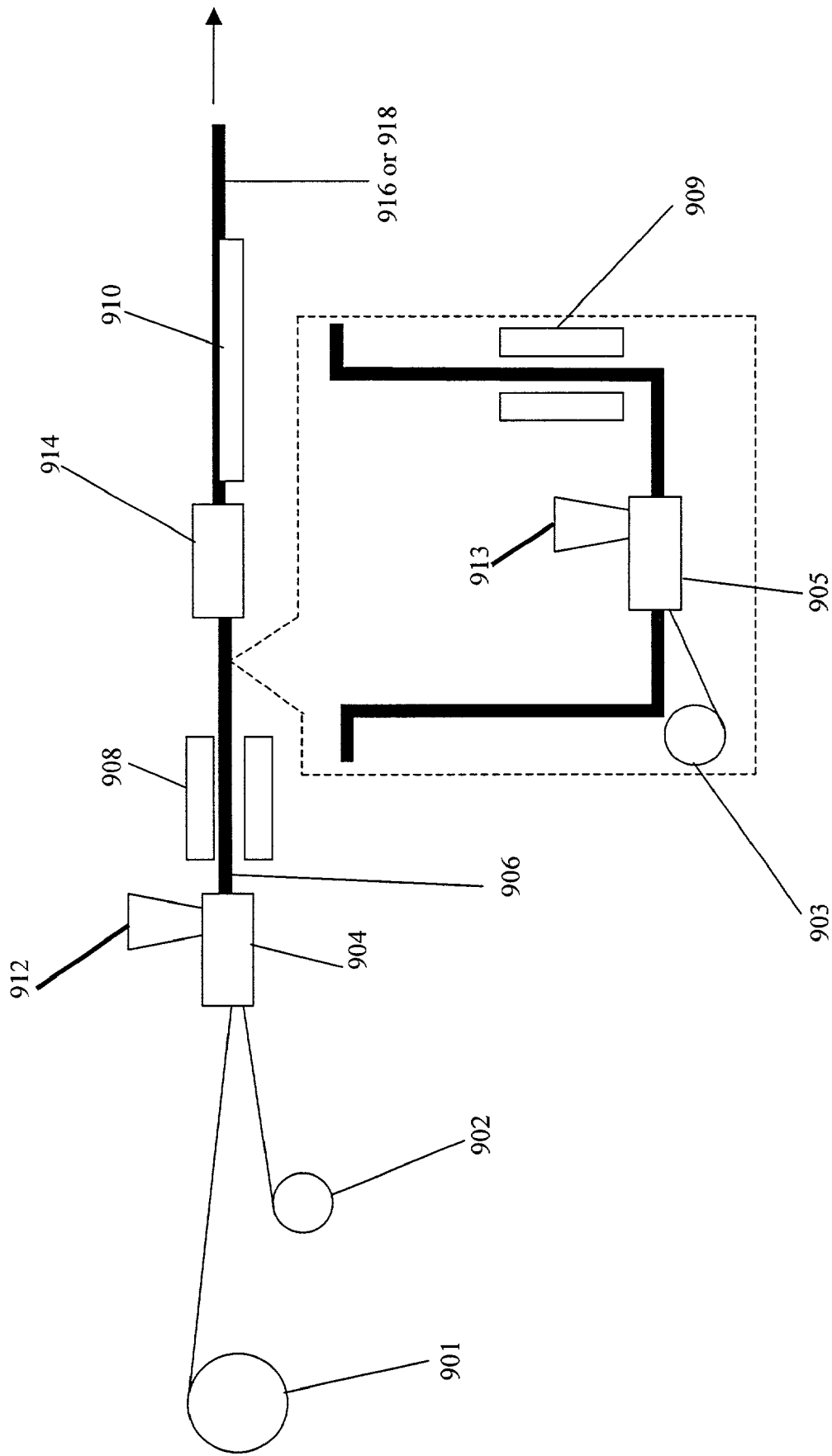
FIG. 9 illustrates an apparatus and method of making reinforced tight-buffered optical fibers consistent with one embodiment of the present invention.

FIG. 9 illustrates a process and apparatus for manufacturing a tight-buffered optical fiber consistent with the present invention. In FIG. 9, optical fiber(s) 901 and strengthening yarns 902 are paid-out off a reel and passed through an applicator 904. Applicator 904 places strengthening yarns 902 longitudinally around optical fiber(s) 901. Simultaneous to optical fiber 901 and strengthening yarns 902 passing through applicator 904, a first layer of buffer material 912 is fed into the applicator 904 and applied around optical fiber(s) 901 and strengthening yarns 902 to form tight-buffered optical fiber(s) 906.

Next, tight-buffered optical fiber(s) 906 is passed through a curing apparatus 908. If buffer material 904 is UV curable, curing apparatus 908 includes one or more UV lamps. Preferably, one UV lamp is used with mirrors to direct UV radiation to the circumference of tight-buffered optical fiber(s) 906. If, however, buffer material 904 is thermally curable, curing apparatus 908 will include a heat producing component, such as a radiant heat oven. Once tight-buffered optical fiber(s) 906 is cured, it is wound on a take-up reel (not shown).

In an alternate embodiment of the process and apparatus for making the tight-buffered optical fiber(s) 906, an extruder 914 or some other means known in the art may be used to apply a protective polymer layer over first buffer material layer 912. Then, upon exiting extruder 914, the coated tight-buffered optical fiber 916 is passed through cooling troughs 910 before the coated tight-buffered optical fiber 916 is taken up on a reel (not shown).

It will be understood by those skilled in the art that additional steps may be used to produce a further reinforced tight-buffered optical fiber(s) 906. For example, depending on the final application and desired overall diameter of tight-buffered optical fiber(s) 906, the method of making tight-buffered optical fiber(s) 906 without the optional protective coating may further include the steps of:

i) using a second applicator 905 for locating a second layer of strengthening yarns 903 longitudinally around optical fiber 901 with the cured first buffer material layer 912;

ii) simultaneously, in second applicator 905, applying a second buffer material layer 913 in a liquid curable composition around the first buffer material layer 912; and iii) using a second curing apparatus 909 to cure second buffer material layer 913 via thermal or ultraviolet radiation. The curing radiation is selected based on the material used for second buffer material layer 913.

Optionally, further steps may be added to this embodiment. In these additional steps, optional extruder 914 or some other means known in the art may be used to apply a protective polymer layer over the second buffer material layer 913. Then, upon exiting the extruder 914, the reinforced tight-buffered optical fiber 918 is passed through cooling troughs 910 before the reinforced tight-buffered optical fiber(s) 918 is taken up on a reel (not shown).

In accordance with the embodiments for the process and apparatus disclosed above, the manufacturing efficiency of making tight-buffered optical fibers is increased. For example, the speed of the manufacturing line may be increased. In one example, the line speed improved from about 300 meters per minute for prior art designs using a PVC tight-buffer material to about 1000 meters per minute when manufacturing the tight-buffered optical fibers of the present invention with an acrylate tight-buffer layer. The acrylate, which is one of the tight-buffer materials that may be used with the embodiments of the present invention, is UV curable and thus permits faster line speeds over common polymers used conventionally, such as PVC.

Consequently, the tight-buffered optical fiber and cable of the present invention can protect its transmission medium from the environment and provide added strength and rigidity. With the arrangement of strength fibers according to this invention, a desired strength for the fibers may be achieved without having to increase the fiber or cable diameter. Moreover, with the use of UV curable coatings, the inventive fiber can be manufactured simply and quickly.

In view of the foregoing, it will be appreciated that the present invention provides tight-buffered optical fibers with embedded strength members. Still, it should be understood that the foregoing relates only to the exemplary embodiments of the present invention. For example, variations in the number of buffer layers and the location of the embedded strength members are not restricted by the particular exemplary embodiments describe herein. Numerous changes may be made thereto without departing from the scope of the invention as defined by the following claims.

What is claimed is:

1. A tight-buffered optical fiber, comprising:
an optical fiber;
at least a first buffer layer of a polymer material enclosing said optical fiber; and
a plurality of strength members embedded in said first buffer layer, said plurality of strength members positioned longitudinally and in contact with said optical fiber and positioned to surround a circumference of said optical fiber.

2. The tight-buffered optical fiber of claim 1, wherein said first buffer layer is constructed from a material that is converted from a liquid curable composition into a cured polymeric material during fiber manufacture.

3. The tight-buffered optical fiber of claim 2, wherein said first buffer layer is a radiation curable material.

4. The tight-buffered optical fiber of claim 2, wherein said first buffer layer is a thermally curable material.

5. The tight-buffered optical fiber of claim 2, wherein said first buffer layer is an acrylate.

6. The tight-buffered optical fiber of claim 1, further comprising:
a second buffer layer of polymer material enclosing said first buffer layer; and
a plurality of strength members embedded in said second buffer layer and longitudinally positioned with respect to said optical fiber.

7. The tight-buffered optical fiber of claim 6, wherein said first and second buffer layers are constructed from a material that is converted from a liquid curable composition into a cured polymeric material during fiber manufacture.

8. The tight-buffered optical fiber of claim 7, wherein said second buffer layer is a radiation curable material.

9. The tight-buffered optical fiber of claim 7, wherein said second buffer layer is a thermally curable material.

10. The tight-buffered optical fiber of claim 7, wherein said second buffer layer is an acrylate.

11. The tight-buffered optical fiber of claim 1, wherein the strength members are yarns selected from the group of aramid, fiberglass, and liquid crystal polymer yarns.

12. The tight-buffered optical fiber of claim 6, wherein the strength members are yarns selected from the group of aramid, fiberglass, and liquid crystal polymer yarns.

13. A method of making a tight-buffered optical fiber, comprising:
passing an optical fiber through an applicator;
placing a plurality of strengthening yarns in said applicator, said plurality of strength yarns positioned longitudinally and in contact with said optical fiber and positioned to surround a circumference of said optical fiber;
applying a first buffer layer in liquid form over said optical fiber; and
curing said first buffer layer.

14. The method of claim 13, wherein said step of applying a first layer includes the substep of:
embedding said plurality of strengthening yarns in said first buffer layer.

15. The method of claim 13, further comprising:
locating a second plurality of strengthening yarns longitudinally around said cured first buffer layer;
applying a second buffer layer in liquid form over said first buffer layer; and
curing said second buffer layer.

16. The method of claim 15, wherein applying a second buffer layer includes:
embedding said second plurality of strengthening yarns in said second buffer layer.

17. The method of claim 13, wherein said curing comprises irradiating said first buffer layer with thermal radiation.

18. The method of claim 13, wherein said curing comprises irradiating said first buffer layer with ultraviolet radiation.

19. The method of claim 13, further comprising extruding a protective layer over said first buffer layer.

20. The method of claim 15, further comprising extruding a protective layer over said second buffer layer.

21. An optical fiber cable, comprising:
at least one tight-buffered optical fiber including an optical fiber, at least a first buffer layer of a polymer material enclosing said optical fiber, a plurality of strength members embedded in said first buffer layer, said plurality of strength members longitudinally positioned in contact with said optical fiber, and positioned to surround a circumference of said optical fiber; and
an overall jacket enclosing said at least one tight-buffered optical fiber.

22. The optical fiber of claim 21, further comprising means for blocking water propagation between said overall jacket and said at least one tight-buffered optical fiber.

* * * * *